(12) United States Patent
Garber et al.

(10) Patent No.: US 7,484,781 B1
(45) Date of Patent: Feb. 3, 2009

(54) CONSTANT DECELERATION BUMPER

(76) Inventors: Isaak Garber, 69 Avenue O Apt. A8, Brooklyn, NY (US) 11204; Lev J. Chudnovsky, 4261 Saline St., Pittsburgh, PA (US) 15217

( * ) Notice: Subject to any disclaimer, the term of this patent is extended or adjusted under 35 U.S.C. 154(b) by 0 days.

(21) Appl. No.: 11/987,157

(22) Filed: Nov. 28, 2007

(51) Int. Cl.
*B60R 19/34* (2006.01)

(52) U.S. Cl. .................. 293/133; 293/132; 293/155; 296/187.09

(58) Field of Classification Search .......... 296/187.03, 296/187.09; 293/132, 133, 155; 188/371, 188/375, 376
See application file for complete search history.

(56) References Cited

U.S. PATENT DOCUMENTS

| | | | |
|---|---|---|---|
| 3,779,591 A * | 12/1973 | Rands ...................... 293/133 |
| 3,898,726 A * | 8/1975 | Godart et al. .............. 29/213.1 |
| 3,899,047 A * | 8/1975 | Maeda et al. ............... 188/374 |
| 3,915,486 A * | 10/1975 | Maeda et al. ............... 293/133 |
| 4,097,080 A * | 6/1978 | Petry ......................... 293/134 |
| 5,090,755 A * | 2/1992 | Garnweidner ............... 293/133 |
| 6,027,105 A * | 2/2000 | Dohrmann et al. .......... 267/139 |
| 6,409,239 B1 * | 6/2002 | Tjoelker et al. ............. 293/133 |
| 6,467,836 B1 * | 10/2002 | Miller et al. ........... 296/187.03 |
| 6,523,873 B1 * | 2/2003 | Summe et al. .............. 293/133 |
| 6,601,886 B1 * | 8/2003 | Thayer ....................... 293/133 |
| 7,357,445 B2 * | 4/2008 | Gross et al. ............ 296/187.09 |

* cited by examiner

*Primary Examiner*—Glenn Dayoan
*Assistant Examiner*—Gregory Blankenship

(57) ABSTRACT

A bumper to absorb energy of motion during a motor vehicle collision, comprising a bumper beam and an energy absorber with a plunger having symmetric protuberances, so that the cross section of protuberances changes along their lengths, an outer tube, and a cutter that cuts off protuberances throughout movement of a collision, where cutting force is controlled by the cross-sectional area of protuberances and provides constant deceleration with minimum force applied to a passenger cabin.

9 Claims, 7 Drawing Sheets

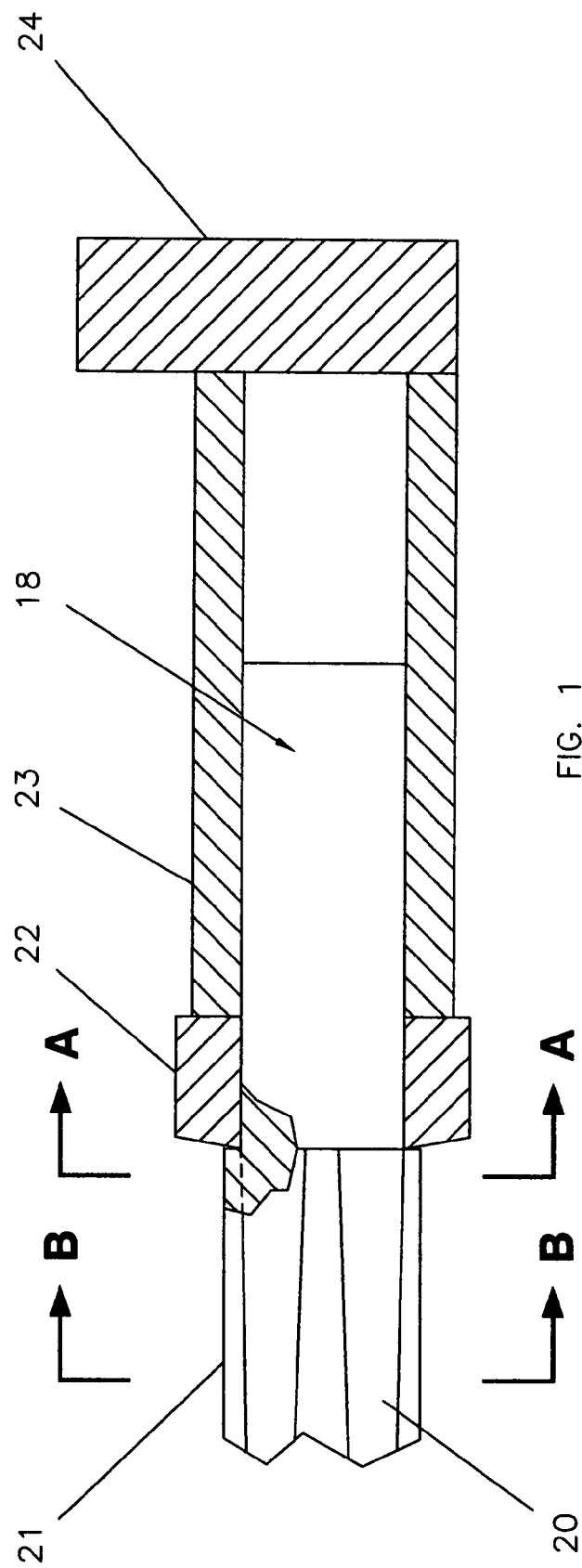
FIG. 1
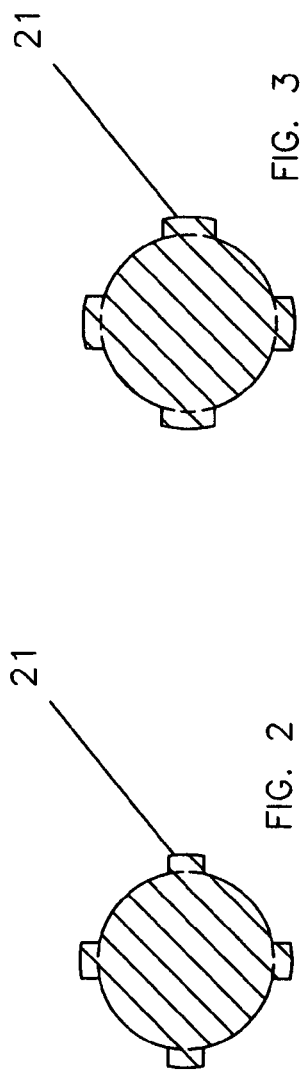
FIG. 2
SECTION A-A
FIG. 3
SECTION B-B

SECTION C-C

DETAIL E
ENLARGED

CONSTANT DECELERATION BUMPER

CROSS-REFERENCE TO RELATED APPLICATIONS

Not applicable

BACKGROUND

1. Field of Invention

The present invention relates to impact absorbing devices, particularly to energy absorbing impact systems for vehicle bumpers and the likes.

2. Description of the Prior Art

Examples of energy absorption units in bumper systems can be found in U.S. Pat. Nos. 6,406,081, 7,066,509, 7,131,674 and 7,192,067. They disclose structures to convert impact energy into bumper deformation.

U.S. Pat. No. 6,942,261 discloses a linear actuator dampening the motion of a piston by forcing a high viscosity liquid to flow through constricted openings. As the piston slides towards the constricted openings, the kinetic energy of the liquid transforms into heat energy.

None of those patents consider optimization by providing constant deceleration and as a result, minimization of forces applied to the passenger cabin and the people in it.

A need still exists for energy absorption systems that minimize forces applied to passengers and can absorb large amounts of energy with predictable energy absorption characteristics. They have to be compact, lightweight, inexpensive, and incorporate a relatively simple design.

SUMMARY

The present invention has been developed in response to the problem that has not been recognized before: providing of constant deceleration and minimization of forces applied to passengers during a collision. The present invention provides predictable energy absorption characteristics, constant deceleration, and minimum force applied to a passenger cabin.

OBJECTS AND ADVANTAGES

A high velocity at the starting moment of a collision decreases to zero at the final moment of the collision. The maximum average deceleration can be calculated as the ratio: maximum velocity over time. If deceleration is not constant, then moments when it is less and greater than the average value, exist. If deceleration is constant, it must be equal to the average, and moments when it is greater than average do not exist. This proves that constant deceleration minimizes the instant deceleration. Since the force applied to a passenger can be calculated as the product: the passenger mass times deceleration, the constant deceleration minimizes forces applied to passengers as well. The object of the present invention is the creation of an apparatus, which provides constant deceleration on the whole path of braking throughout a collision. The length of this path is predictable and can be made more or less by a vehicle designer.

In the present invention, energy of collision spends on cutting or plastic deformation of a collection of protuberances whose total cross-sectional area changes providing constant deceleration for the maximum value of the initial velocity of impact.

Constant deceleration bumpers are relatively lightweight, can be inexpensively manufactured and can easily achieve different energy absorption characteristics.

DRAWINGS FIGURES

FIG. 1 is a longitudinal cross-sectional view of a constant deceleration bumper.

FIG. 2 shows a section of the plunger, which is closer to the cutter.

FIG. 3 shows a section of the plunger, which is away from the cutter.

DRAWING REFERENCE NUMERAL WORKSHEET

| PART NO. | PART NAME |
| --- | --- |
| 18 | Energy Absorber |
| 19 | Telescoping Energy Absorber |
| 20 | Plunger |
| 21 | Protuberance |
| 22 | Cutter |
| 23 | Outer Tube |
| 24 | Bumper Beam |
| 25 | Intermediate Plunger |
| 26 | Vehicle Frame |

DESCRIPTION

FIGS. 1, 2, 3, 5, 8—Preferred Embodiment

Figure 5:
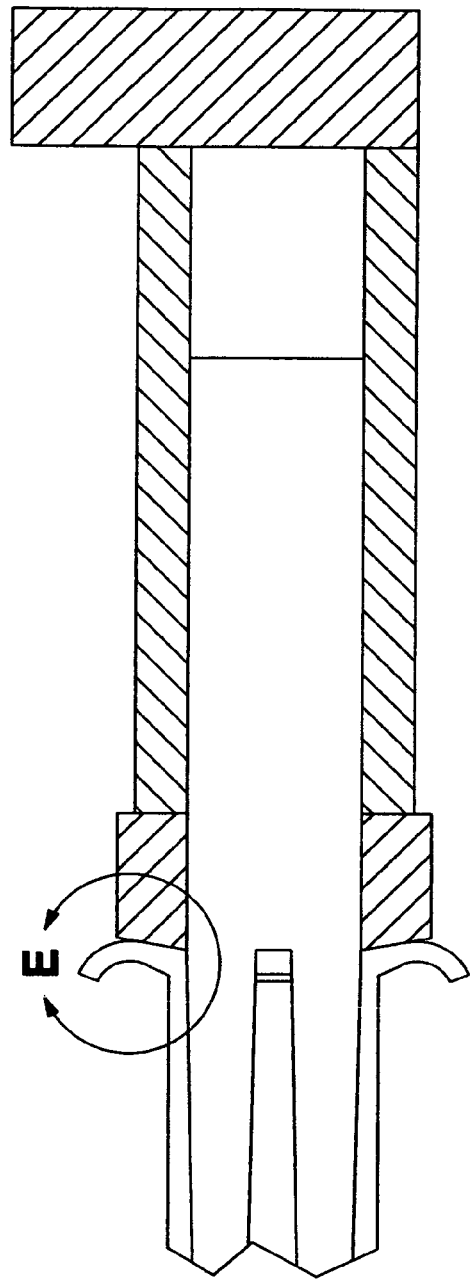
FIG. 5 is a longitudinal cross-sectional view of a constant deceleration bumper for the duration of the collision.

A preferred embodiment of the bumper of the present invention is illustrated in FIG. 1 (the position before impact) and FIG. 5 (an intermediate position during the collision). FIG. 1 shows a longitudinal cross-sectional view of a constant deceleration bumper having a plunger 20 with a plurality of symmetric protuberances 21. One end of the plunger is connected to the vehicle frame (not shown on FIG. 1) and the other end, which is free from protuberances, is partially disposed within one end of an outer tube 23. The other end of outer tube 23 is connected to a bumper beam 24. A cutter 22 is installed on the end of outer tube 23, where plunger 20 is inserted, and in the initial position (before impact) touches protuberances 21. The cross sectional area of protuberances 21 depends on the distance between the cross section and the initial position of cutter 22 as illustrated in FIGS. 2 and 3. Additional modifications of the total cross sectional area of all protuberances 21 can be achieved by changing their number.

An assembly that consists of plunger 20, cutter 22 and outer tube 23 is an energy absorber 18. Therefore, the preferred embodiment can be interpreted as a connection of bumper beam 24 and energy absorber 18.

Plunger 20 and outer tube 23 are made from steel, aluminum, metal alloy or plastic. Cutter 22 is made from heat-treated alloy steel or carbon tool steel.

Operation

At the moment of collision, a force directed along the longitudinal axis of the energy absorber appears. If this force is large enough, cutter 22 starts to cut off protuberances 21. The force depends on the total cross-sectional area of all protuberances and velocity of the relative motion of plunger 20 and outer tube 23. This force decreases the motor vehicle velocity throughout the collision. If the cross-sectional area of protuberances were constant, the force would decrease. However, in the present invention, the total cross-sectional area of protuberances increases and compensates for the decrease in velocity. As a result, after the initial moment of impact, deceleration remains constant throughout the motion.

The number of protuberances and cross-sectional dimensions can be calculated to achieve constant deceleration of a vehicle after impact. We denote:

S as the required total cross-sectional area of protuberances 21;

x as the length of protuberances, which has been cut;

$V_0$ as the maximum initial speed of the impact, and

V as speed when length x of protuberances is cut

Since we require that deceleration is constant and equals a, one can write the expression for V:

$$V^2 = V_0^2 - 2ax. \qquad (1)$$

Cutting of protuberances starts when the force that is applied to cutter 22 reaches some minimum value, which we denote as $F_0$ Force $F_0$ is proportional to the total cross-sectional area of protuberances S:

$$F_0 = hS. \qquad (2)$$

Figure 8:
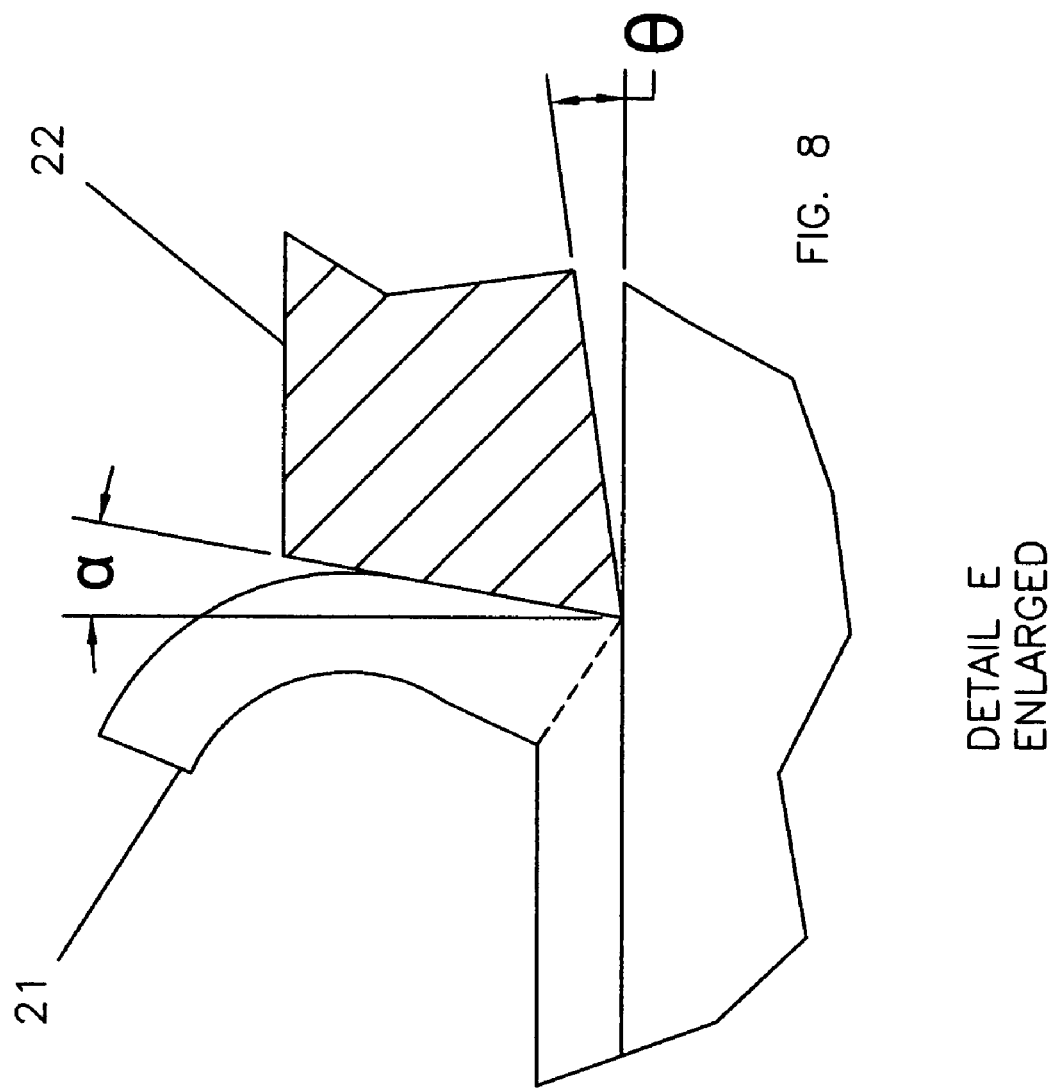
FIG. 8 is an enlarged detail view of the cutter with cutting angles.

The coefficient of proportionality h can be found using methods of resistance of materials or experimentally, using cutter 22 with the same angles $\alpha$ and $\theta$ (FIG. 8).

The velocity of cutting V requires force F, which is applied to cutter 22, to exceed value $F_0$ by a force that is proportional to both V and S:

$$F = F_0 + kSV. \qquad (3)$$

Coefficient k may be found either using theory of cutting of metals or experimentally. Experimental methods of finding coefficients h and k are preferable because they give more precise results taking into account not only angles $\alpha$ and $\theta$, but also the cutter and protuberances materials.

The second law of Newton states:

$$F = ma, \qquad (4)$$

where m denotes the vehicle's mass.

When x=L, where L is the length of the protuberances, velocity V must be equal to zero and (1) yields:

$$a = V_0^2 / 2L \qquad (5)$$

Expression (5) gives us two possibilities:

1) if the maximum value of the short-time deceleration, which is safe when passengers use seat belts and air bags are functioning, is known, and the length of protuberances is given, then (5) allows one to calculate $V_0$;

2) if $V_0$ is specified, a car developer can calculated L.

Substitution of (1), (2), and (4) into (3) produces:

$$ma = hS + kS(V_0^2 - 2ax)^{1/2},$$

which yields:

$$S = ma/[h + k(V_0^2 - 2ax)^{1/2}], \qquad (6)$$

or replacing a by (5)

$$S = m\, V_0^2/2L[h + kV_0(1 - x/L)^{1/2}] \qquad (7)$$

Expressions (6) and (7) allow one to calculate the protuberances cross-sectional area for any $0 \leq x \leq L$.

If a collision happens with velocity $V_1 < V_0$, then expression (3), which is still correct, shows that the initial deceleration $a_1 < a$. Deceleration in this case is not constant, yet at any moment it remains less than the deceleration when initial velocity is $V_0$.

DESCRIPTION

Figure 10:
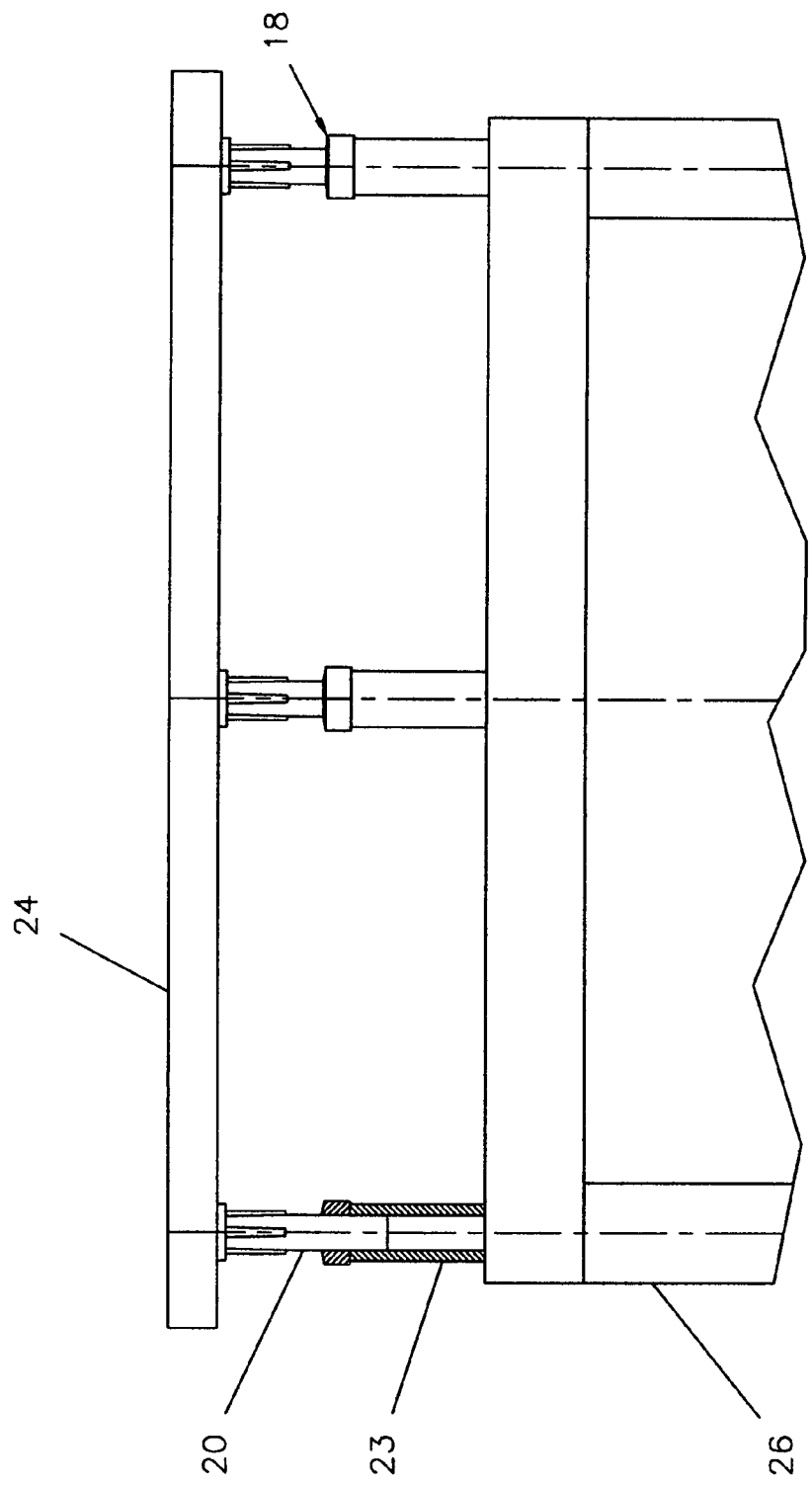
FIG. 10 is a top view of a constant deceleration bumper with several energy absorbers.

FIG. 10—Additional Embodiment

In this embodiment, outer tube 23 is connected to vehicle frame 26, and plunger 20 is connected to bumper beam 24.

DESCRIPTION

FIG. 10—Additional Embodiment

Two or more energy absorbers 18 are connected to bumper beam 24 in order to distribute the forces that are applied to each energy absorber 18 during a collision.

DESCRIPTION

Figure 4:
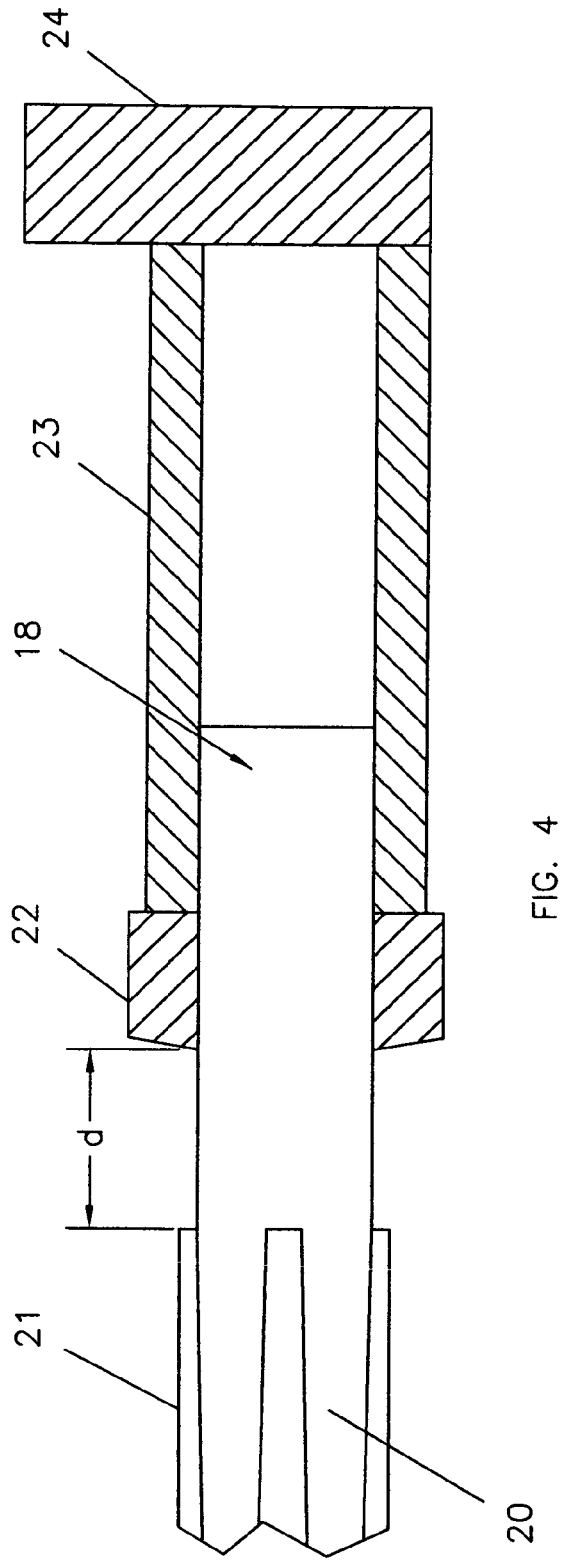
FIG. 4 is a longitudinal cross-sectional view of a constant deceleration bumper with a distance between the cutter and protuberances in pre-impact condition.

FIG. 4—Additional Embodiment

The energy absorber is not reusable, and even a small path where protuberances are cut off during a weak collision requires its complete replacement. The additional embodiment relates to the use of bumper beam 24 to provide complete absorption of energy if a collision is weak. After such a collision, replacement of the present invention bumper is not necessary. For this to be achieved, cutter 22 in the initial position does not touch protuberances 21, but is placed within distance d from them (FIG. 4). Distance d corresponds to the maximum allowable deformation of bumper beam 24. If the relative motion of plunger 20 and outer tube 23 continues, then the collision is considered to be strong and energy absorber 18 starts to operate.

DESCRIPTION

Figure 6:
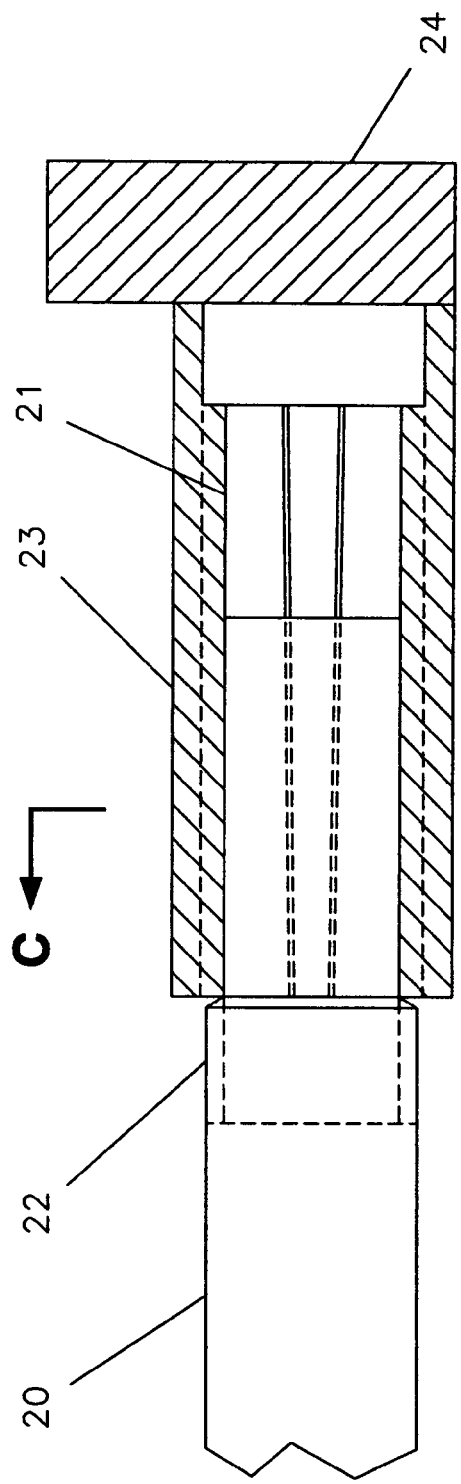
FIG. 6 is a longitudinal cross-sectional view of a constant deceleration bumper where protuberances are located on the outer tube and the cutter is connected to the plunger.

FIG. 6, 7—Alternative Embodiment

Figure 7:
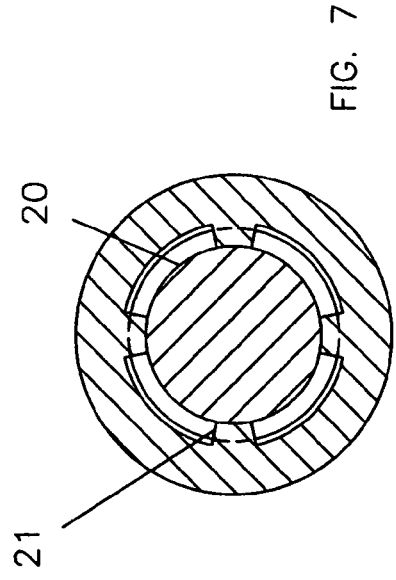
FIG. 7 is a sectional view of the plunger and the outer tube with protuberances.

FIG. 6 and FIG. 7 illustrate a different design of an energy absorber. Cutter 22 is connected to plunger 20 and outer tube 23 has protuberances 21. Outer tube 23 is connected to bumper beam 24 and plunger 20 is connected to the vehicle frame (not shown).

DESCRIPTION

FIG. 8—Alternative Embodiment

On this embodiment, angles $\alpha$ and $\theta$ of cutter 22 (FIG. 8) are so small that cutter 22 transforms into a tool for plastic deformation, and when a collision happens, protuberances 21 are removed by it. Since plastic deformation requires a greater force than cutting, such a replacement increases values of force and deceleration.

DESCRIPTION

Figure 9:
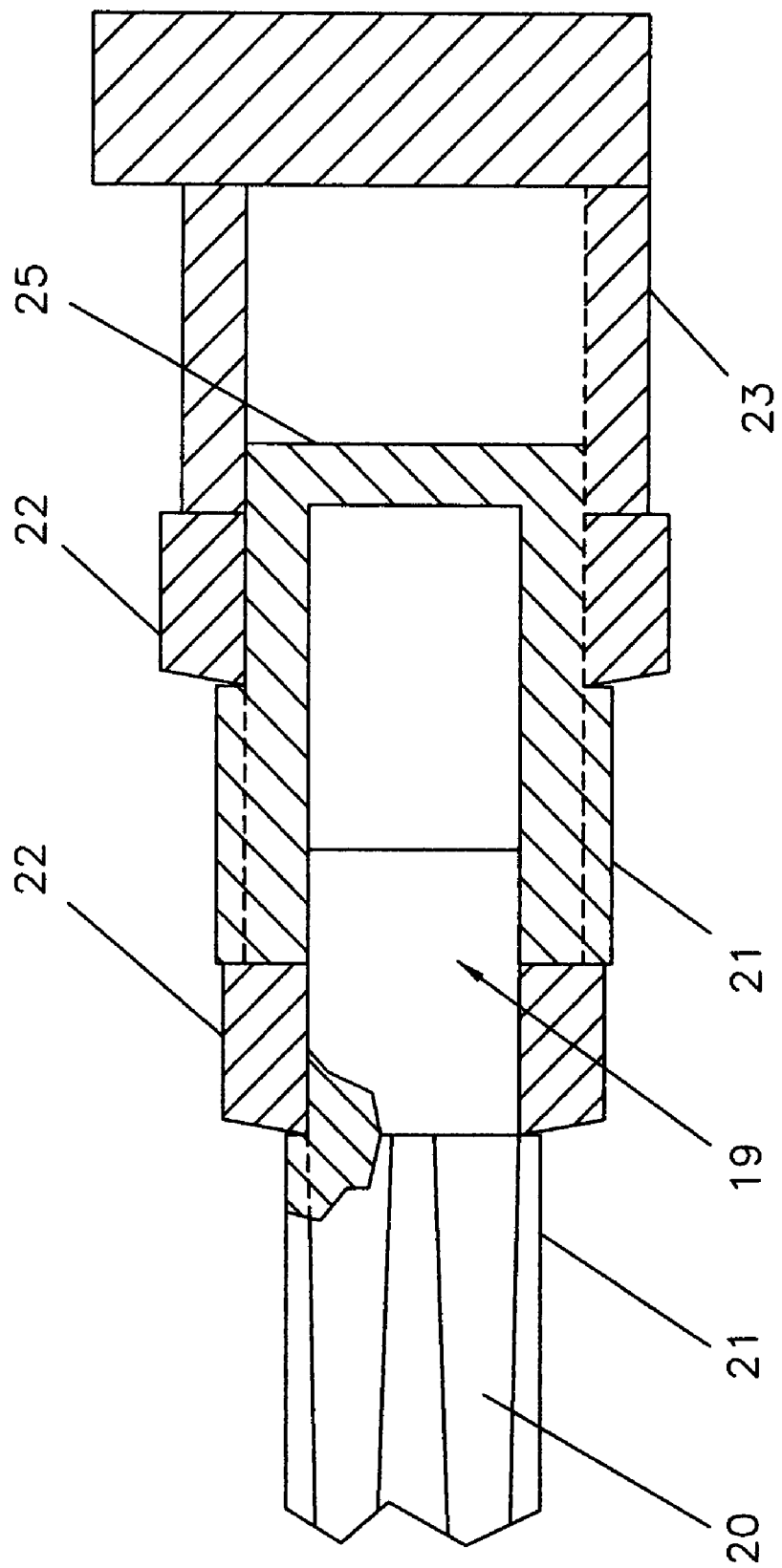
FIG. 9 is a longitudinal cross-sectional view of a constant deceleration bumper utilizing telescoping construction of the energy absorber.

FIG. 9—Alternative Embodiment

On this embodiment, as shown in FIG. 9, energy absorber 19 utilizes a telescoping construction. An intermediate plunger 25 is simultaneously constructed as a plunger and an outer tube. It has an opening and its internal surface works like an outer tube for plunger 20 which can shift into it. Cutter 22, connected to plunger 25, touches protuberances 21 of plunger 20. An external surface of plunger 25 has protuberances 21, which touch additional cutter 22. An additional cutter 22 is connected to outer tube 23. The end of intermediate plunger 25, which is free from protuberances, is inserted into outer tube 23.

Operation

For the period of a collision, plunger 20 shifts inside the intermediate plunger 25. Cutter 22 is connected to intermediate plunger 25, and cuts off protuberances 21. An additional cutter 22 is connected to outer tube 23 and cuts protuberances off the outer surface of intermediate plunger 25.

DESCRIPTION

Figure 11:
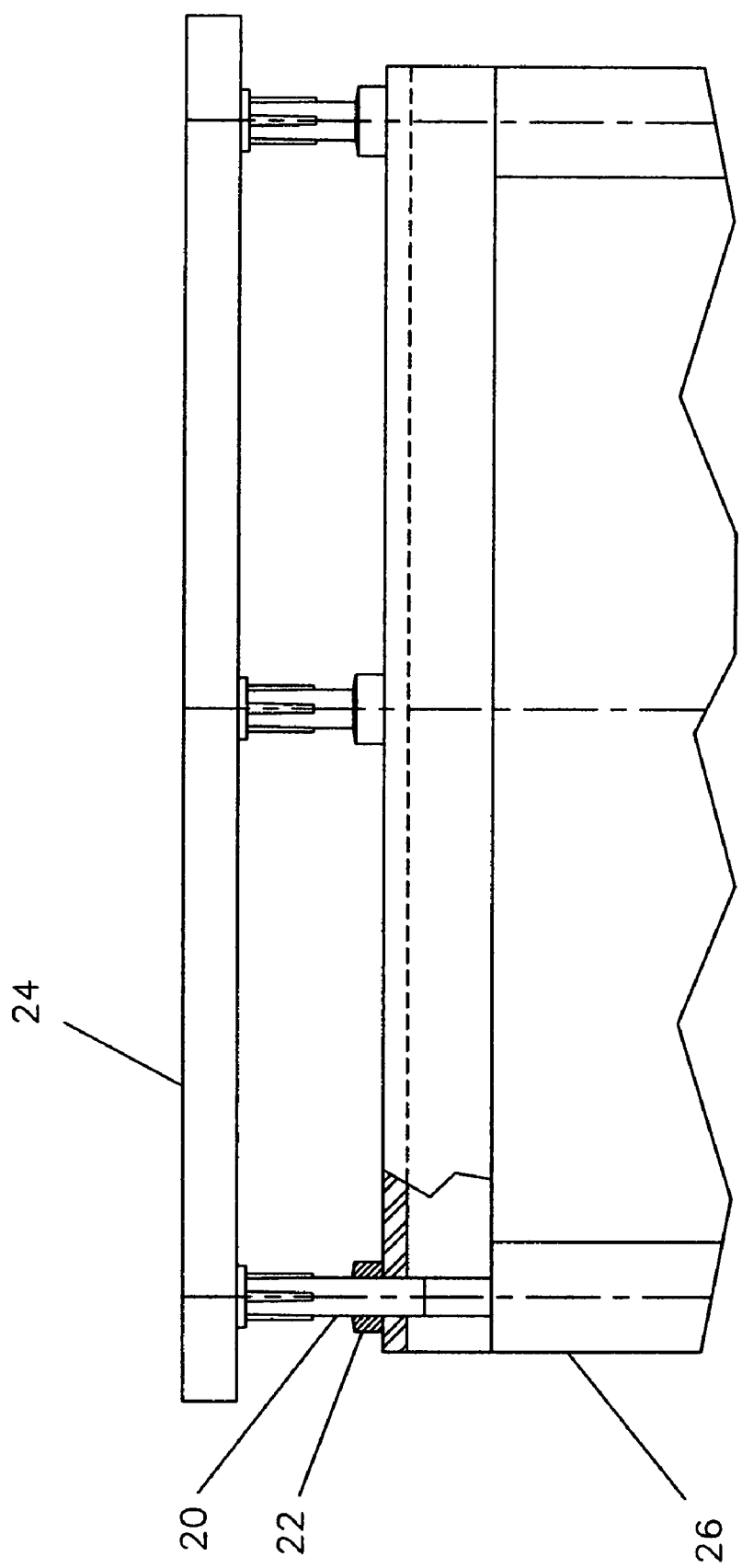
FIG. 11 is a top view of a constant deceleration bumper where the outer tube is a part of the motor vehicle frame.

FIG. 11' Alternative Embodiment

On this embodiment, a part of motor vehicle frame 26 operates as an outer tube. Cutters 22 are connected to frame 26 and plungers 20 are connected to bumper beam 24.

Advantages

From the description above the following advantages become evident:

a) The present invention provides constant deceleration which minimizes the forces applied to passengers;
b) The working length of the energy absorber, which is equal to the length of the protuberances, is predictable and can be chosen by vehicle designers;
c) Constant deceleration bumpers are compact, lightweight, inexpensive, and incorporate a relatively simple design.

CONCLUSION, RAMIFICATIONS, AND SCOPE

Accordingly, the reader can see that the constant deceleration bumper can be used to increase safety of car passengers. It can be used to decrease damage from front, rear, and side collisions.

Although the description above contains much specificity, these should not be construed as limiting the scope of the invention but as merely providing illustrations of some of the presently preferred embodiments of this invention. For example, the outer tube and plunger may have different cross sectional shapes, such as oval or rectangular, multiple energy absorbers can be connected to the bumper beam by the plunger, or a part of multiple energy absorbers may be connected to the bumper beam by the outer tube and the other part by the plunger. Many different constructions of existing bumpers may be used as the bumper beam of the present invention.

Thus, the scope of the invention should be determined by the appended claims and their legal equivalences, rather than by the examples given.

The invention claimed is:

1. An energy absorber of a motor vehicle providing constant deceleration and minimum force, which applies to a passenger cabin for the period of a collision, comprising: an outer tube and a plunger having a plurality of symmetric protuberances, which is inserted within said outer-tube with an end, which has a free from protuberances segment, where a cross-sectional area of said protuberances changes along the length of said plunger, and a cutter, which is connected to said outer tube and touches protuberances, whereby a force of cutting off protuberances by said cutter is controlled by said cross-sectional area and provides constant deceleration of said passenger cabin.

2. An energy absorber of claim 1 wherein said end of said plunger, which has a segment free of protuberances, is inserted into said outer tube with a distance between said protuberances and said cutter, whereby the operation of said bumper starts only when a collision is strong.

3. An energy absorber of a motor vehicle providing constant deceleration and minimum force, which applies to a passenger cabin for a period of a collision, comprising:
   an outer tube having a plurality of symmetric protuberances on an inner surface, where a cross-sectional area of said protuberances changes along a length of said outer tube;
   a plunger which is inserted within said outer tube; and,
   a cutter which is connected to said plunger and touches said protuberances, whereby a force of cutting off said protuberances by said cutter is controlled by said cross-sectional area and provides constant deceleration of said passenger cabin.

4. An energy absorber of a motor vehicle providing constant deceleration and minimum force, which applies to a passenger cabin for a period of a collision, comprising:
   an outer tube and a plunger having a plurality of symmetric protuberances, which is inserted within said outer tube, an end of the plunger, which has a free from protuberances segment, where a cross-sectional area of said protuberances changes along a length of said plunger; and,
   a tool to remove said protuberances by plastic deformation, which is connected to said outer tube and touches said protuberances, whereby a force of plastic deformation of protuberances by said tool is controlled by said cross-sectional area and provides constant deceleration of said passenger cabin.

5. An energy absorber of claim 1 with telescoping construction wherein said plunger is inserted with said end, which is free of protuberances, within an intermediate plunger, and said cutter is connected to said intermediate plunger; said intermediate plunger has said protuberances on the external surface and an end, which is free of protuberances, is inserted into said outer tube; an additional said cutter is connected to said outer tube, whereby the length of said energy absorber is reduced.

6. An energy absorber of claim 1, wherein the outer tube is connected to a bumper beam of said motor vehicle.

7. An energy absorber of claim 1, wherein the plunger is connected to a bumper beam of the motor vehicle.

8. An energy absorber of claim 6, wherein the vehicle comprises at least two of said energy absorber.

9. An energy absorber of claim 8, wherein said outer tubes form parts of a frame of said motor vehicle.

* * * * *